United States Patent
Lin et al.

(10) Patent No.: US 11,520,620 B2
(45) Date of Patent: Dec. 6, 2022

(54) ELECTRONIC DEVICE AND NON-TRANSITORY STORAGE MEDIUM IMPLEMENTING TEST PATH COORDINATION METHOD

(71) Applicant: Fulian Precision Electronics (Tianjin) Co., LTD., Tianjin (CN)

(72) Inventors: Chih-Hsuan Lin, New Taipei (TW); Shang-Yi Lin, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 317 days.

(21) Appl. No.: 16/899,385

(22) Filed: Jun. 11, 2020

(65) Prior Publication Data

US 2021/0357251 A1    Nov. 18, 2021

(30) Foreign Application Priority Data

May 12, 2020   (CN) .......................... 202010397654.8

(51) Int. Cl.
  *G06F 9/48*   (2006.01)
  *G01D 3/10*   (2006.01)
  *G06F 11/00*  (2006.01)

(52) U.S. Cl.
  CPC .............. *G06F 9/485* (2013.01); *G01D 3/10* (2013.01); *G06F 11/006* (2013.01)

(58) Field of Classification Search
  CPC .................................................... G06F 11/006
  See application file for complete search history.

(56) References Cited

U.S. PATENT DOCUMENTS 8,381,197 B2 * 2/2013 Meenakshisundaram .................. G06F 11/3684 717/135
2011/0088014 A1 * 4/2011 Becker ................ G06F 11/3684 717/124

FOREIGN PATENT DOCUMENTS

TW          202011291          3/2020

* cited by examiner

*Primary Examiner* — Henry Tsai
*Assistant Examiner* — Juanito C Borromeo
(74) *Attorney, Agent, or Firm* — ScienBiziP, P.C.

(57) ABSTRACT

A test path coordination method includes obtaining information of a number of products to be tested, obtaining information of each test device, and planning a test path of each product according to a preset rule according to the information of the products and the information of each test device. The information of the products includes the number of the products, test items of each product, and test devices required for testing the test items. The information of each test device includes whether the test device is currently testing a product and test information of the product currently being tested. The test information of the product includes a length of time the product has been tested and a test result. The test path includes a test sequence of each product and a test sequence of the test items of each product.

15 Claims, 4 Drawing Sheets

ELECTRONIC DEVICE AND NON-TRANSITORY STORAGE MEDIUM IMPLEMENTING TEST PATH COORDINATION METHOD

FIELD

The subject matter herein generally relates to testing technology, and more particularly to a test path coordination method for coordinating a test path of a plurality of products to be tested.

BACKGROUND

Communication products need to undergo multiple tests before shipment. The products are tested by different test devices, and different test devices test different test items of the products. When a product is tested by a test device, other products need to wait to be tested, and much time is wasted.

BRIEF DESCRIPTION OF THE DRAWINGS

Implementations of the present disclosure will now be described, by way of embodiments, with reference to the attached figures.

DETAILED DESCRIPTION

Figure 1:
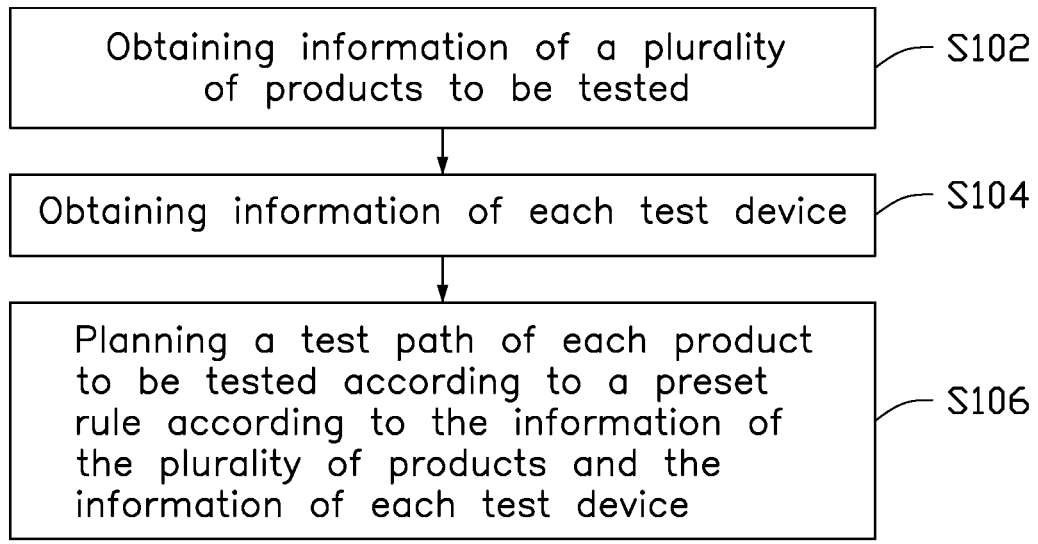
FIG. 1 is a flowchart of a test path coordination method.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows a flowchart of a test path coordination method. The test path coordination method is used for coordinating the sequence in which multiple products are tested on multiple test devices. The test path coordination method may include the following blocks.

Block S102: Information of a plurality of products to be tested is obtained. The information of the plurality of products includes the number of the products, test items of each product, test devices required for testing the test items, and test duration of each test item. The test duration of the test item is the standard duration or the average duration, which an operator can modify according to actual situations. In an embodiment, the plurality of products is the same products, for example, all are switches, and the same products have the same test items. In another embodiment, the plurality of products includes different products, for example, some products are switches, and some products are routers. The information of the plurality of products includes the number of each product. Different types of products have at least one different test item. The product information also includes identification information of the product, so that the type of product can be identified according to the identification information of the product.

Block S104: information of each test device is obtained. The information of the test device includes whether the test device is currently testing a product and test information of the product currently being tested. The test information of the product includes the length of time the product has been tested and the test result.

Block S106: a test path of each product is planned according to a preset rule according to the information of the plurality of products and the information of each test device. The test path includes the test sequence of each product and the test sequence of the test items of each product.

In an embodiment, the information of the product further includes a test sequence of at least two test items among a plurality of the test items of the product, and the test path conforms to the test sequence in the information of the product.

In one embodiment, the preset rule is that the test process of the plurality of products takes the shortest time. In an embodiment, the test devices include a parallel test device and at least one non-parallel test device. The non-parallel test device can only test one product at a time, and cannot test more than one product in parallel, and the preset rule is to not wait or wait the shortest total time when testing the plurality of products on the non-parallel device. Specifically, the preset rule is to make the non-parallel test device have the shortest total waiting time in the test process, so that when there is no product being tested on the non-parallel test device, the test path is re-planned. In this way, according to whether there is a product being tested on the non-parallel test device, the test path can be adjusted in time so that the total waiting time of the non-parallel test device is the shortest.

The preset rule further includes determining a product to not be further tested when a test item of the product is unqualified, and re-planning the remaining test path of the products to be tested. Since one test item of the product fails, there is no need to test the remaining test items of the product. In this case, the remaining test path of the products to be tested after removing the unqualified product can save a remaining testing time of the products to be tested.

Figure 2:
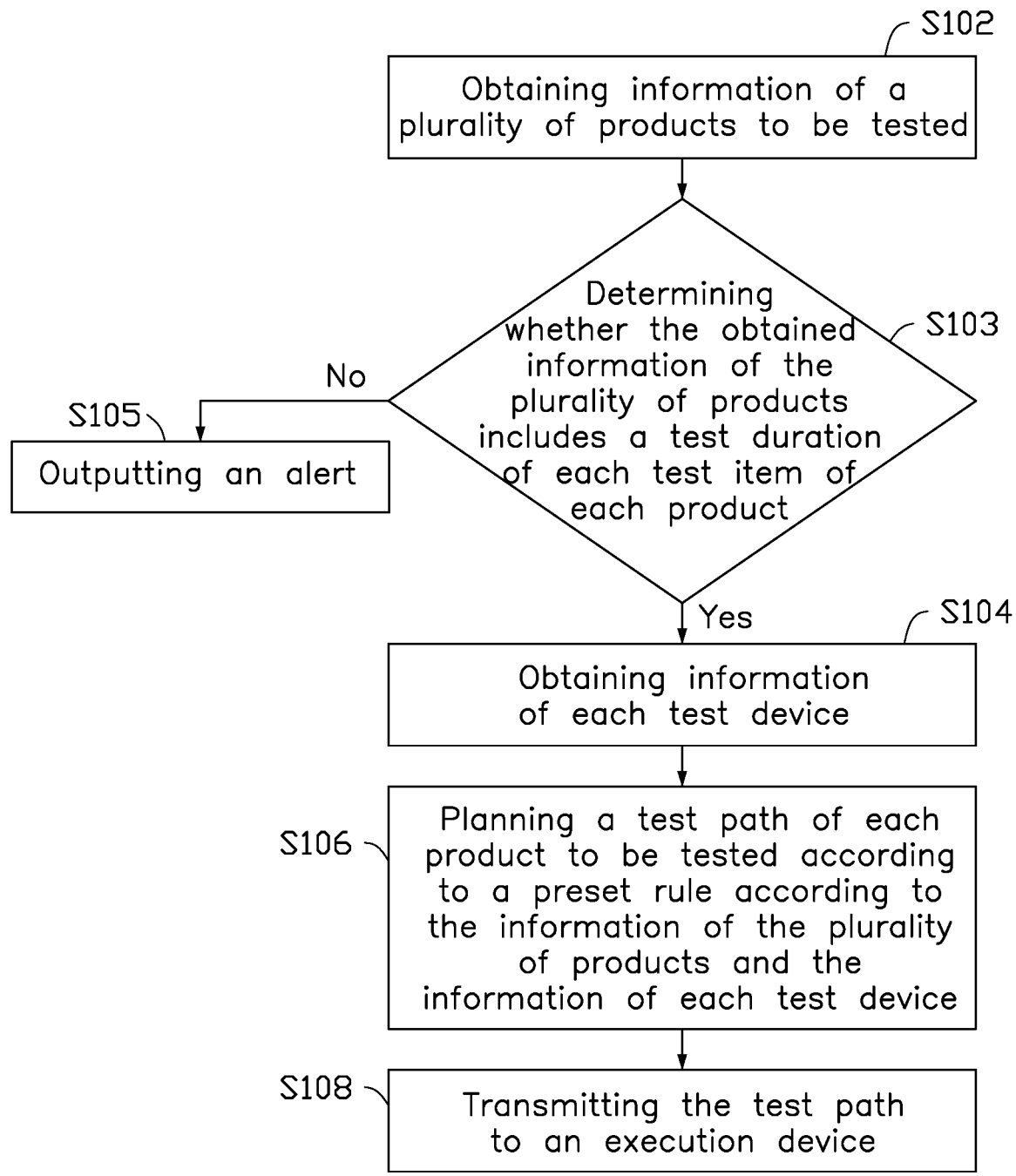
FIG. 2 is another embodiment of the test path coordination method.

Referring to FIG. 2, in an embodiment, the test path coordination method further includes block S103 after block S102, and block S108 after block S106.

Block S103: whether the acquired information of the plurality of products includes the test duration of each test item of each product is determined. When the information of the plurality of products includes the test duration of the test item of each product, block S104 is implemented. Otherwise, block S105 is implemented.

It can be understood that block S103 may also be after block S104 and before block S106. When the test duration of each test item of each product is included in the information of the plurality of products, block S106 is implemented. Otherwise, block S105 is implemented.

Block S105: An alert is output to remind relevant operators to supplement product information. The alert may be text information or audio information. In one embodiment, the product information includes product identification information, and the alert includes the product identification information of the product with incomplete information. In this way, the operator can know which product information is incomplete without having to check the information of each product, which helps to quickly complete the product information.

Block S108: The test path is transmitted to an execution device, so that the execution device transfers a plurality of the products to the corresponding test device for testing according to the test path.

Figure 3:
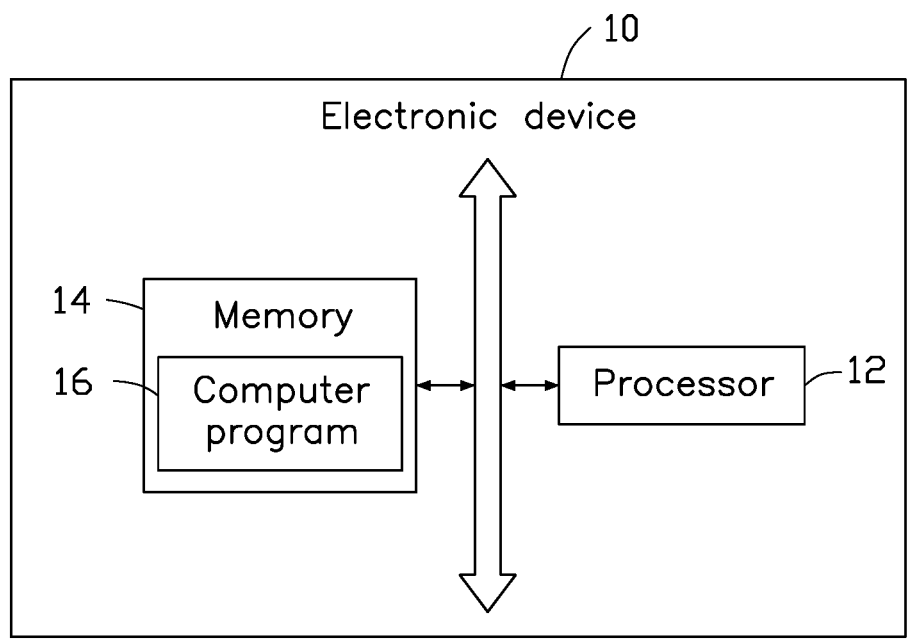
FIG. 3 is a schematic block diagram of an electronic device.
Figure 4:
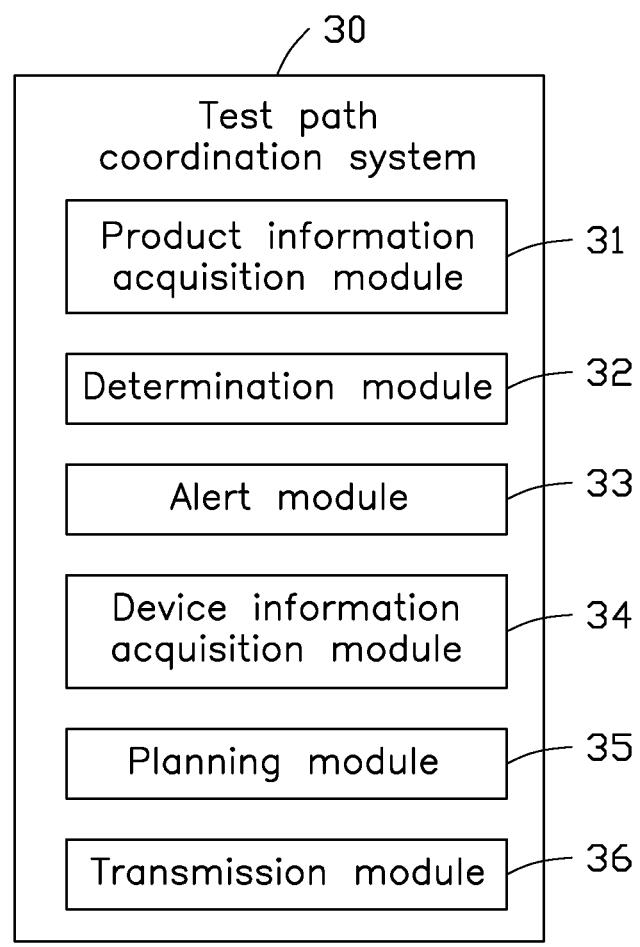
FIG. 4 is a schematic block diagram of a test path coordination system.

FIG. 3 shows a schematic diagram of an electronic device 10. The electronic device 10 includes, but is not limited to, a processor 12, a memory 14, and a computer program 16 stored in the memory 14 and executable by the processor 12. The computer program 16 includes a test path coordination program. When the processor 12 executes the computer program 16, blocks S102-S108 in the test path coordination method are implemented. Alternatively, the processor 12 implements functions of a test path coordination system 30 shown in FIG. 4 when the computer program 16 is executed.

The electronic device 10 may be a computing device such as a computer or a server. A person skilled in the art may understand that the schematic diagram is only an example of the electronic device 10 and does not constitute a limitation on the electronic device 10, and may include more or less components than the illustration, or a combination of certain components, or different components, for example, the electronic device 10 may further include input and output devices, network access devices, buses, and the like.

The processor 12 may be a central processing unit, or other general-purpose processors, digital signal processors, application specific integrated circuits, Field-Programmable Gate Arrays, or other programmable logic device, discrete gate or transistor logic device, discrete hardware component, etc. The general-purpose processor may be a microprocessor or the processor 12 may also be any conventional processor, etc. The processor 12 is a control center of the electronic device 10, and uses various interfaces and lines to connect various parts of the entire electronic device 10.

The memory 14 may be used to store the computer program 16 and/or modules. The processor 12 executes the computer program and/or modules stored in the memory 14. The memory 14 may mainly include a storage program area and a storage data area, wherein the storage program area may store an operating system, at least one application program (such as an image processing program), etc.; the storage data area may store created data during use of the electronic device 10. In addition, the memory 14 may include a high-speed random access memory, and may also include a non-volatile memory, such as a hard disk, a memory, a plug-in hard disk, a Smart Media Card, a Secure Digital Card, a flash memory card, at least one disk storage device, flash memory device, or other volatile solid-state storage device.

The test path coordination system 30 runs in the electronic device 10. The test path coordination system 30 may include multiple function modules composed of program code segments. The program code segments in the test path coordination system 30 may be stored in the memory 14 of the electronic device 10 and executed by at least one processor 12.

In one embodiment, the test path coordination system 30 is divided into a plurality of function modules according to different functions. The function modules include a product information acquisition module 31, a determination module 32, an alert module 33, a device information acquisition module 34, a planning module 35, and a transmission module 36. It can be understood that, in other embodiments, the above-mentioned modules may also be program instructions or firmware fixed in the processor 12.

The product information acquisition module 31 is configured to obtain information of a plurality of products to be tested. Functions of the product information acquisition module 31 are described in relation to block S102, and details will not be repeated.

The determination module 32 is configured to determine whether the obtained information of the plurality of products includes the test duration of each test item of each product. The alert module 33 is configured to output an alert with the incomplete information when it is determined that the obtained information of the plurality of products does not include the test duration of each test item of each product.

The device information acquisition module 34 is configured to obtain information of each test device. Functions of the device information acquisition module 34 are described in relation to block S104, and details will not be repeated. In one embodiment, the electronic device 10 is communicatively connected to each test device to obtain the information of each test device. In another embodiment, the information of each test device is uploaded to a server, the electronic device 10 is in communication with the server, and the information of each test device is obtained from the server.

The planning module 35 is configured to plan the test path of each product according to a preset rule according to the information of the plurality of products and the information of each test device. Functions of the planning module 35 are described in relation to block S106, and details will not be repeated.

The transmission module 36 is configured to transmit the test path to one or more execution devices so that the one or more execution devices transfers a plurality of the products to the corresponding test device for testing according to the test path. In this way, without manual handling, the execution device transfers the products according to the test path to achieve accurate transmission of the products.

If the integrated modules of the electronic device 10 are implemented in the form of a software functional unit and sold or used as an independent product, it may be stored in a computer-readable storage medium. Based on this understanding, the present disclosure can implement all or part of the processes in the methods of the above embodiments, and can also be completed by a computer program instructing relevant hardware. The computer program can be stored in a computer-readable storage medium. When the computer program is executed by the processor, the blocks of the foregoing method embodiments may be implemented.

Wherein, the computer program includes computer program code, and the computer program code may be in the form of source code, object code, executable file, or some intermediate form. The computer readable medium may include: any entity or device capable of carrying the computer program code, a recording medium, a U disk, a mobile hard disk, a magnetic disk, an optical disk, a computer memory, a read-only memory, a Random Access Memory, electrical carrier signals, telecommunications signals, software distribution media, etc.

The test path coordination method and electronic device 10 plan the test path of each product according to the preset rule according to the information of the plurality of products and the information of the test devices, and can prevent crowding or waiting during testing according to the preset rule, which helps reduce the test duration of the plurality of products.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A test path coordination method implemented in an electronic device, the method comprising:
   obtaining information of a plurality of products to be tested, the information of the plurality of products comprising the number of the products, test items of each product, and test devices required for testing the test items;
   obtaining information of each test device, the information of each test device comprising whether the test device is currently testing a product and test information of the product currently being tested, the test information of the product comprising a length of time the product has been tested and a test result; and
   planning a test path of each product according to a preset rule according to the information of the plurality of products and the information of each test device, the test path comprising a test sequence of each product and a test sequence of the test items of each product;
   wherein the information of each product further comprises a test sequence of at least two test items among a plurality of test items of the product, and the test path conforms to the test sequence in the information of the product.

2. The test path coordination method of claim 1, wherein:
   the plurality of products comprises different kinds of products; and
   the information of the plurality of products comprises the number of each kind of product.

3. The test path coordination method of claim 1, further comprising:
   determining whether the obtained information of the plurality of products comprises a test duration of each test item of each product; and
   when the information of the plurality of products does not comprise the test duration of each test item of each product, outputting an alert.

4. The test path coordination method of claim 1, further comprising:
   transmitting the test path to an execution device.

5. The test path coordination method of claim 1, wherein:
   the preset rule is that a test process of the plurality of products takes the shortest time.

6. The test path coordination method of claim 1, wherein:
   the test devices comprise a parallel test device and at least one non-parallel test device;
   when the at least one non-parallel test device is used for testing, the preset rule is to wait the shortest total time when testing the plurality of products.

7. The test path coordination method of claim 1, wherein:
   the preset rule further comprises determining a product to not be further tested when a test item of the product is unqualified, and re-planning the remaining test path of the plurality of products to be tested.

8. An electronic device comprising:
   a processor; and
   a memory storing a plurality of instructions, which when executed by the processor, cause the processor to:
   obtain information of a plurality of products to be tested, the information of the plurality of products comprising the number of the products, test items of each product, and test devices required for testing the test items;
   obtain information of each test device, the information of each test device comprising whether the test device is currently testing a product and test information of the product currently being tested, the test information of the product comprising a length of time the product has been tested and a test result; and
   plan a test path of each product according to a preset rule according to the information of the plurality of products and the information of each test device, the test path comprising a test sequence of each product and a test sequence of the test items of each product;
   wherein the information of each product further comprises a test sequence of at least two test items among a plurality of test items of the product, and the test path conforms to the test sequence in the information of the product.

9. The electronic device of claim 8, wherein:
   the plurality of products comprises different kinds of products; and
   the information of the plurality of products comprises the number of each kind of product.

10. The electronic device of claim 8, wherein the processor is further configured to:
    determine whether the obtained information of the plurality of products comprises a test duration of each test item of each product; and
    when the information of the plurality of products does not comprise the test duration of each test item of each product, output an alert.

11. The electronic device of claim 8, wherein the processor is further configured to:
    transmit the test path to an execution device.

12. The electronic device of claim 8, wherein:
    the preset rule is that a test process of the plurality of products takes the shortest time.

13. The electronic device of claim 8, wherein:
    the test devices comprise a parallel test device and at least one non-parallel test device;
    when the at least one non-parallel test device is used for testing, the preset rule is to wait the shortest total time when testing the plurality of products.

14. The electronic device of claim 8, wherein:
    the preset rule further comprises determining a product to not be further tested when a test item of the product is unqualified, and re-planning the remaining test path of the plurality of products to be tested.

15. A non-transitory storage medium having stored thereon instructions that, when executed by at least one processor of an electronic device, causes the at least one processor to execute instructions of a test path coordination method, the method comprising:
- obtaining information of a plurality of products to be tested, the information of the plurality of products comprising the number of the products, test items of each product, and test devices required for testing the test items;
- obtaining information of each test device, the information of each test device comprising whether the test device is currently testing a product and test information of the product currently being tested, the test information of the product comprising a length of time the product has been tested and a test result; and
- planning a test path of each product according to a preset rule according to the information of the plurality of products and the information of each test device, the test path comprising a test sequence of each product and a test sequence of the test items of each product;
- wherein the information of each product further comprises a test sequence of at least two test items among a plurality of test items of the product, and the test path conforms to the test sequence in the information of the product.

* * * * *